(12) United States Patent
Thompson

(10) Patent No.: US 7,027,896 B2
(45) Date of Patent: Apr. 11, 2006

(54) INTEGRATED PROTECTION AND CONTROL SYSTEM FOR A POWER SYSTEM SUBSTATION

(75) Inventor: Michael J. Thompson, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 90 days.

(21) Appl. No.: 10/643,379

(22) Filed: Aug. 19, 2003

(65) Prior Publication Data

US 2005/0043861 A1 Feb. 24, 2005

(51) Int. Cl.
*H02H 3/00* (2006.01)

(52) U.S. Cl. .......................................... 700/292; 361/62

(58) Field of Classification Search ........ 700/292–294; 361/62, 64, 66, 115
See application file for complete search history.

(56) References Cited

U.S. PATENT DOCUMENTS 5,940,260 A * 8/1999 Gelbien et al. ............... 361/62

OTHER PUBLICATIONS

Barrick, "Distributed data acquisition system for substation bus protection and monitoring" IEEE, WESCON/98, Sep. 1998, pp. 315-320.*

Suzuki et al. "Development of a substation digital protection and control system using fiber-optic local area network" Jul. 1989, IEEE Transactions on Power Delivery, vol. 4, Issue 3, pp. 1668-1675.*

Udren et al. "In tegrated system for substation relaying and control shows benefit" Jan. 1989, IEEE computer applications in power, vol. 2, Issue 1, pp. 21-27.*

* cited by examiner

*Primary Examiner*—Albert W. Paladini
*Assistant Examiner*—Steven R. Garland
(74) *Attorney, Agent, or Firm*—Cook, Alex, McFarron, Manzo, Cummings & Mehler, Ltd.

(57) ABSTRACT

The substation control system, being responsive to a plurality of status input signals from various power system assemblies includes a plurality of input/output modules, each having a fiber-optic transceiver capability, wherein wire connections are used to communicate the status signals from the power system assemblies to input contacts of the respective I/O modules. The output signals from the I/O module are applied to a fiber-optic line. The system also includes a plurality of logic processors, each responsive to the signals on a fiber-optic line from a plurality of input-output modules for application to a plurality of protective relay devices, which provide protection operations and generate output signals. The logic processors also have a part in the overall protection arrangement. The output signals are communicated back to the power system assemblies for local control and protection thereof and to SCADA systems for remote control thereof.

13 Claims, 1 Drawing Sheet

INTEGRATED PROTECTION AND CONTROL SYSTEM FOR A POWER SYSTEM SUBSTATION

TECHNICAL FIELD

This invention relates generally to substation control systems which are part of an electric power system, and more specifically concerns the protection and control arrangement for such control systems.

BACKGROUND OF THE INVENTION

Electric power substations are part of an electric power system serving a specific geographical area. In a conventional substation, transmission lines, typically within a usual range of 46 kV–500 kV, provide high voltage power. Distribution feeders extend from the substation, in the range of typically 12 kV to 34.5 kV.

A substantial amount of power system protection occurs at the substation, with the protection equipment typically in a control house in the substation yard. The control house will include protective relays and related communication equipment. Various bus lines and bus transfer lines for carrying the high voltage, as well as transformers and bus-tie arrangements, are present at the power substation. Typically, inputs from the various power system equipment, indicating the status thereof, and power flow information, such as the status of various circuit breakers in the substation, are provided over wire connections to the protective relays and related devices within the control house. The protective relays/devices oversee all of the status/power system condition information concerning the various bus lines, transfer lines, transformers and circuit breakers at the substation and provide alarms and circuit breaker trip control signals when such power system equipment is indicated to be outside of specified operating limits.

Alarm signals are also generated by the power system equipment, including alarms from the circuit breakers and the transformers if the condition/operation of the equipment is outside selected limits. This could include, for example, a low pressure alarm from a circuit breaker or a particular physical aspect of a transformer. Other alarms are also possible, even substation yard intrusion alarms. All of this information is provided to the protective relays in the central control house by hardwire connections.

Hence, the control and protection equipment in the control house is responsive to a substantial amount of information, including alarms and other information concerning the operating status of a variety of power system equipment within the substation yard.

Currently, all of the connections from the various power equipment devices are provided by hardwire, i.e. copper, connections, to the individual protective relays in the control house. Each control/protection line requires a separate wire and a separate physical connection to the appropriate relay, i.e. a separate input contact. This arrangement has substantial disadvantages, including expense of the copper wire, relatively long leads, complexity of the overall wiring system and difficulty in the actual wiring, and maintaining the individual wire connections. The complexity and expense of the system typically results in an inability to provide dual, i.e. redundant protection. Failure at any one point in the substation can have significant consequences on the power system, in the absence of a redundant/backup system. Further, the long wire connections provide opportunities for interference from other signals, induction and ground potential rise. Still further, when separate wires extend from one station point, such as a disconnect switch, to a plurality of protection circuit/systems, one or more of the individual connections can fail, leading to that circuit responding incorrectly.

Hence, it would be desirable to have a simpler arrangement which makes less use of hardwire connections while providing fast, convenient, redundant protection which would increase reliability of the protection and control system at a substation

SUMMARY OF THE INVENTION

Accordingly, the present invention includes a substation control system, responsive to a plurality of inputs from power system assemblies in the substation, comprising: at least one remote input/output module having a fiber-optic transceiver capability; wire connections, for providing status indications from selected status points in the power system assemblies to input contacts of the input/output module, wherein output signals from the remote fiber-optic module are in a form which can be applied to a fiber-optic line; at least one logic processor connected to a fiber-optic line from the input-output module and responsive to signals thereon for communication thereof to protective relay devices; a fiber-optic communication line connecting the remote input/output module and the logic processor; and at least one protective relay responsive to signals from the logic processor to perform protection functions and to produce corresponding control output signals, wherein the control output signals are applied back to the power system assemblies for control thereof.

BEST MODE FOR CARRYING OUT THE INVENTION

Figure 1:
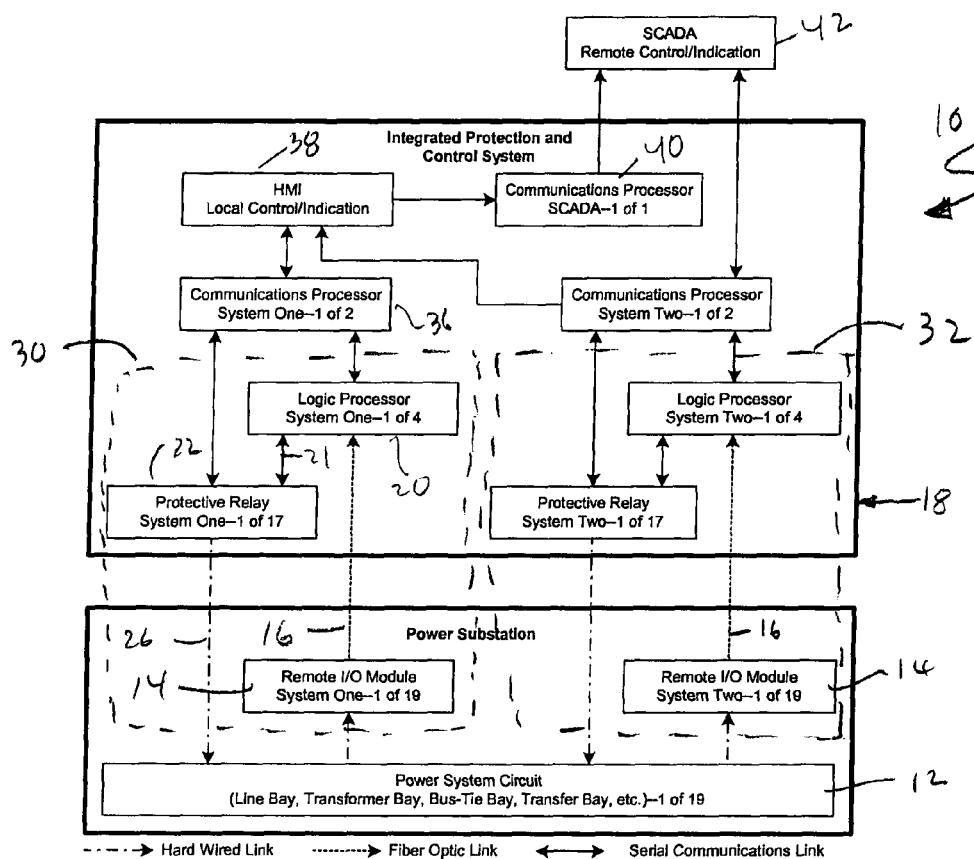
FIG. 1 is a block diagram of the overall control system of the present invention.

The present invention is a substation control system responsive to all of the conventional input signals of a typical substation. These include signals/alarms concerning the status of the circuit breakers for the various bus lines in the substation yard, as well as signals relating to alarms from various equipment in the yard, including low pressure alarms from the circuit breakers, various aspects of transformer status and operation and the status of the motor-operated disconnect switches on the bus lines.

Generally, these inputs are grouped as "bays", including line bays for the various bus lines, transformer bays for the various transformers, bus-tie bays for the bus-tie assemblies and transfer bays for the transfer lines, among others. The above are some examples of power system lines and related equipment assemblies within the substation which are monitored by the protection and control equipment in the control house. This overall system of the present invention is shown at 10 in FIG. 1, while the various sources of input signals to the control house equipment are shown generally as a group at 12 in FIG. 1. Again, actual inputs to the control house equipment in a particular situation may vary; the input section shown at 12 is intended to encompass a wide variety of possible inputs from the power system equipment at the substation.

In the system of the present invention, the inputs from the various power system equipment assemblies are provided via hardwire connections over a relatively short distance (typically approximately 10–30 meters to one of a plurality of remote I/O (input-output) modules 14—14. The individual wire connections, typically copper, are secured to separate input contacts on the remote I/O module. Each I/O module will typically, but not necessarily, receives the inputs from one bay of inputs, usually in the range of 1–8 individual inputs. The remote input-output modules 14—14 are conventional devices, such as SEL Model 2500 from Schweitzer Engineering Laboratories, Inc., which receives a plurality of input signals on separate wires at individual input contacts and provides outputs on a fiber-optic communication line.

The I/O module 14 includes a fiber-optic transceiver which converts the input signals into a form for use on a fiber-optic communication line 16. The fiber-optic line 16 has the advantage of eliminating long hardwire connections, specifically, in the embodiment shown, the hardwire connections from the power system equipment to the I/O modules 12 are short, with the remaining distance to the control house being fiber-optic connections. The use of the I/O module, with a fiber-optic transceiver, makes this possible. It reduces significantly the possibility of interference, induction and voltage use, to which wire connections are susceptible. Various I/O devices can be used. However, the remote input-output module must convert the signals on multiple input wires to a fiber-optical output. Thus, it simplifies the wiring arrangements in the overall system significantly.

The fiber-optic connection 16 from the remote I/O module 14 extends into the control house 18 and specifically to a logic processor 20. In one example, the length of the fiber connection 16 can be up to 300 meters and even more, depending upon the size of the yard. Logic processor 20 will receive the signals from the I/O module over the fiber-optic connection and will process them prior to providing the signals to a conventional protective relay, represented at 22. The logic processor 20 provides certain protection functions and provide input signals to one or more protective relays. One example of an appropriate logic processor is the SEL-2100 from Schweitzer Engineering Laboratories, Inc. Other logic processors, however, can be used. The logic processor will typically be capable of transmitting and receiving digital communications, providing communication-assisted protection schemes using various protection devices, and can be used to provide various tripping functions, bus protection, breaker failure and other applications.

The protective relays 22 connected to the logic processor can be any of a variety of such relays, including distance relays, differential relays; overcurrent relays, phase and ground distance relays and other relays, to provide the protection functions for the power system.

The system of the present invention in its simplest form will include a single I/O module, responsive to a plurality (1–8) of inputs from power system equipment, a single logic processor and a single protective relay. However, a more typical system might include 20 remote I/O modules, each responsive to a plurality of inputs from various power system equipment bays and four logic processors responsive to fiber-optic signals from the plurality of remote I/O devices. Such a system could also typically include approximately 17 individual protective relays 22 responsive to information signals from one logic processor 20. It should be understood, however, that the number of remote I/O modules, the number of logic processors and the number of protective relays can vary significantly within the scope of the present invention, depending upon the particular application.

When the protective relays perform their conventional protection functions, the outputs of the relays for protection and control are provided back by hardwired connections 26 to the power system equipment. For example, the output signals could include alarms or could be used to control the motor operated disconnect switches for the power bus lines or could be used to directly trip the circuit breaker controlling a particular bus line. Hence, protection signals from the protective relay are quickly provided to the individual power system assemblies when indicated, following completion of the protection functions by the relay(s).

The outputs of the protective relays, are also applied back to the logic processors 20 through the two-way communication line 21. The information back to the logic processor could be provided, for instance, to a relay in another bay.

In FIG. 1, the present system, involving a plurality of remote input/output modules, a plurality of logic processors and a plurality of protective relays, can be arranged in a dual or redundant system, as shown by blocks 30 and 32 in FIG. 1. The specific structural arrangement of FIG. 1, including the fiber connection 16 between the I/O modules and the logic processors in the control house, permits redundancy. In most present substation arrangements, redundancy is not possible, due to wiring complexity and expense.

The results of the redundant systems can be compared by the HMI computer/interface 38. If the results provided by the two systems do not agree, i.e. are incongruent, then the particular malfunction of the system causing the disagreement can be identified and corrected before it produces any incorrect system operation.

Thus, in the present invention, due to the combination of the short hardwire connections, the fiber line/link which covers most of the distance between the I/O modules and the logic processors, and the basic arrangement of I/O modules, logic processors and protective relays, in the hierarchy shown, the overall system is efficient, and makes maximum use of the capability of the individual elements of the system, particularly the protective relays, which can be quite sophisticated. Further, the present system uses dual, i.e. redundant protection/control systems and a comparison capability to ensure the accuracy of the overall system and to quickly identify and correct malfunctions.

Still further, with the arrangement shown, in particular with the use of logic processors, a single status point signal, such as the status of a disconnect switch on one of the bus lines, is provided to the logic processor, with the logic processor then providing that signal to the protection circuits, e.g. a plurality of relays, requiring the status signal for operation, for example, breaker-failure protection, distance protection, etc. Each critical power system equipment status point is thus brought in just once to the two systems, instead of separately and individually from the status point to each protection circuit. The present arrangement eliminates the possibility of the individual systems responding incorrectly because of an incorrect status indication. The status indication is validated by use of the dual systems and the HMI interface. Then that status signal can be provided to multiple relays by the logic processor.

Referring still to FIG. 1, the output signals from the various protective relays 22 in the control house 18 can be used like in conventional systems, applied to a communications processor 36, which operates in conventional function to provide controlled access to a plurality of protective relays in the control house. A human-machine interface (HMI) computer 38 accesses the communications processor. The HMI device 38 provides an ability to the user for local control and status indication of equipment. Further, the human-machine interface (HMI) 38 can be connected through another communications processor 40 to a conventional SCADA device 42 for remote control/monitoring functions. In addition to the output of the (HMI) computer 38, the SCADA device receives input from the communication processor in system 32, without going through the HMI interface 32. Hence the local control and indication system within the control house is separate from the remote control and indication system, carried out by SCADA from a system 32 which is separate from system 30

While the embodiment of FIG. 1 includes at least one logic processor and in a typical system 4 or more, it is possible in a system having a small number of power system inputs 12 that the output from a single I/O device 14 can be applied directly to a protective relay for processing and carrying out of protection functions, eliminating the logic processor 20. Protective relays currently are quite sophisticated, having a capability of receiving and processing a fairly large number of inputs and can operate with inputs from a single I/O module. Thus, in some situations, the logic processors can be eliminated, although in most cases, they will be necessary for the proper and efficient overall function of the system of the present invention, as discussed above.

Accordingly, a protection and control system for an electric power substation control system has been disclosed which uses at least one remote module which is responsive to a plurality of inputs from power system assemblies in the substation yard, and produces outputs for transmission over a fiber-optic line. Long hardwire connections are thus eliminated, replaced by short wire connections between the power system assemblies and the I/O module, the remaining distance to the control house being covered by fiber communication lines. Redundant systems are provided in a typical control house, eliminating single points of failure within the overall system and providing an ability to validate status inputs and such that status point information need to be brought into each dual system just once. Local control and indication at the substation can be separate from the remote (SCADA) operation.

Although a preferred embodiment of the invention has been described for purposes of illustration, it should be understood that various changes, modifications and substitutions may be incorporated in the embodiment without departing from the spirit of the invention which is defined in the claims which follow.

What is claimed is:

1. A substation control system, responsive to a plurality of inputs from power system assemblies in the substation, comprising:
   at least one remote input/output module having a fiber-optic transceiver capability;
   wire connections, for providing status indication signals from selected status points in the power system assemblies, to input contacts of the input/output module, wherein output signals from the remote fiber-optic module are in a form which can be applied to a fiber-optic line, and wherein said status indication signals are monitored by the input/output module for the state of the status indication signals;
   at least one logic processor connected to a fiber-optic line from the input-output module and responsive to signals thereon for communication thereof to protective relay devices;
   a fiber-optic communication line connecting the remote input/output module and the logic processor; and
   at least one protective relay responsive to signals from the logic processor to perform protection functions and to produce corresponding control output signals, wherein the control output signals are applied back to the power system assemblies for control thereof.

2. The system of claim 1, wherein the logic processor is located in a control house at the substation and wherein the fiber-optic line covers most of the distance between a power system assembly and the logic processor.

3. The system of claim 1, Wherein the system includes a plurality of remote input-output modules, a plurality of logic processors, and a plurality of protective relays, wherein each logic processor receives signals from a plurality of input-output modules, and wherein each logic processor provides information to a plurality of protective relays.

4. The system of claim 1, wherein at least one output signals from the protective relay is also provided back to the logic processor.

5. The system of claim 1, wherein the system includes two similar substation control systems, both responsive to said status indications from the power system equipment assemblies, connected and operating redundantly in said substation control system.

6. The system of claim 5, including means for comparing operation of said two substation control systems and for providing an alarm if the two systems do not agree.

7. The system of claim 5, wherein the system includes means for comparing monitored status indication signals of the two similar substation control systems, and the comparing means generates an alarm if the monitored status indication signals are not substantially similar.

8. The system of claim 1, wherein communication over the fiber-optic line between the remote input/output and the logic processor and between the logic processor and each device with which it communicates is in the form of digital bits, suitable for communication over a fiber-optic line.

9. The system of claim 1, wherein a single status indication is provided to the logic processor from each status point in the power system assemblies and wherein the logic processor provides said status indications to multiple selected relay circuits for carrying out protection functions.

10. The system of claim 1, further comprising a human-machine interface coupled to the logic processor, the human-machine interface capable of controlling the relay, and where the logic processor communicates the status indication signals to the human-machine interface.

11. The system of claim 10, further comprising a communications processor coupled to a first device from the group consisting of the protective relay, the logic processor, and the human-machine interface, and where the communications processor is further coupled to a second device from the group consisting of the protective relay, the logic processor, and the human-machine interface, the first device not being the same as the second device, and the communications processor further coupling the first device to the second device.

12. The system of claim 1, further comprising a remote control interface coupled to the logic processor, the remote control interface capable of controlling the relay, and where the logic processor communicates the status indication signals to the remote control interface.

13. The system of claim 1, further comprising a remote control interface coupled to the logic processor and a human-machine interface coupled to the logic processor, wherein the remote control interface and the human-machine interface consist of entirely different hardware, and the remote control interface is coupled to the logic processor independently from the human-machine interface.

* * * * *